United States Patent [19]
Steinberg

[11] Patent Number: 5,862,218
[45] Date of Patent: Jan. 19, 1999

[54] METHOD AND APPARATUS FOR IN-CAMERA IMAGE MARKING AND AUTHENTICATION

[75] Inventor: Eran Steinberg, San Francisco, Calif.

[73] Assignee: FotoNation, Inc., San Mateo, Calif.

[21] Appl. No.: 627,441

[22] Filed: Apr. 4, 1996

[51] Int. Cl.$^6$ ............................. H04N 7/167; H04N 5/76; H04K 1/00; G09C 3/00
[52] U.S. Cl. ............................ 380/10; 348/231; 348/233; 348/552; 380/18; 380/23; 380/54
[58] Field of Search ................................. 380/10, 18, 23, 380/54; 348/231, 233, 552

[56] References Cited

U.S. PATENT DOCUMENTS

| | | | |
|---|---|---|---|
| 5,027,401 | 6/1991 | Soltesz | 380/54 |
| 5,499,294 | 3/1996 | Friedman | 380/10 |
| 5,581,613 | 12/1996 | Nagashima et al. | 380/21 |

*Primary Examiner*—Stephen C. Buczinski
*Attorney, Agent, or Firm*—David H. Jaffer

[57] ABSTRACT

A camera with a built in microprocessor system programmed to receive an input password and indicium from a host computer. The camera is configured to use the indicium in combination with a conversion formula to mark an original acquired image in a non-destructive manner to form modified image data and add the indicium to an image header. The camera also creates image authentication data for comparison with corresponding data of a questionable second image to determine if the second image is the same as or different from the original image. This process of marking and creating authentication data all occur during acquisition and prior to any image data storage in a medium from which a person could subsequently access data. The camera takes the authentication data and stores it along with the marked image data in memory for subsequent transmission to the host computer. The preferred embodiment of the authentication involves the creation of checksum data, involving the addition of pixel values from each image row and each image column. These sums are then stored in a lookup table for future use in comparing with the result of the same checksum calculation done on questionable image data at a future time. The original image can be viewed only through presentation of the password.

18 Claims, 14 Drawing Sheets

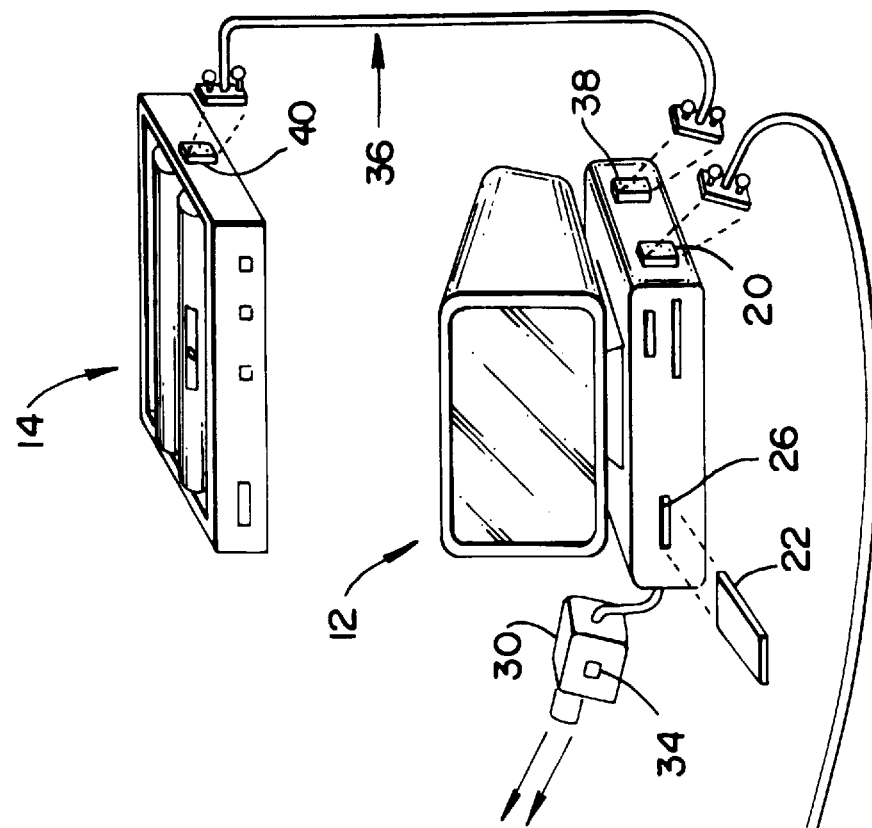
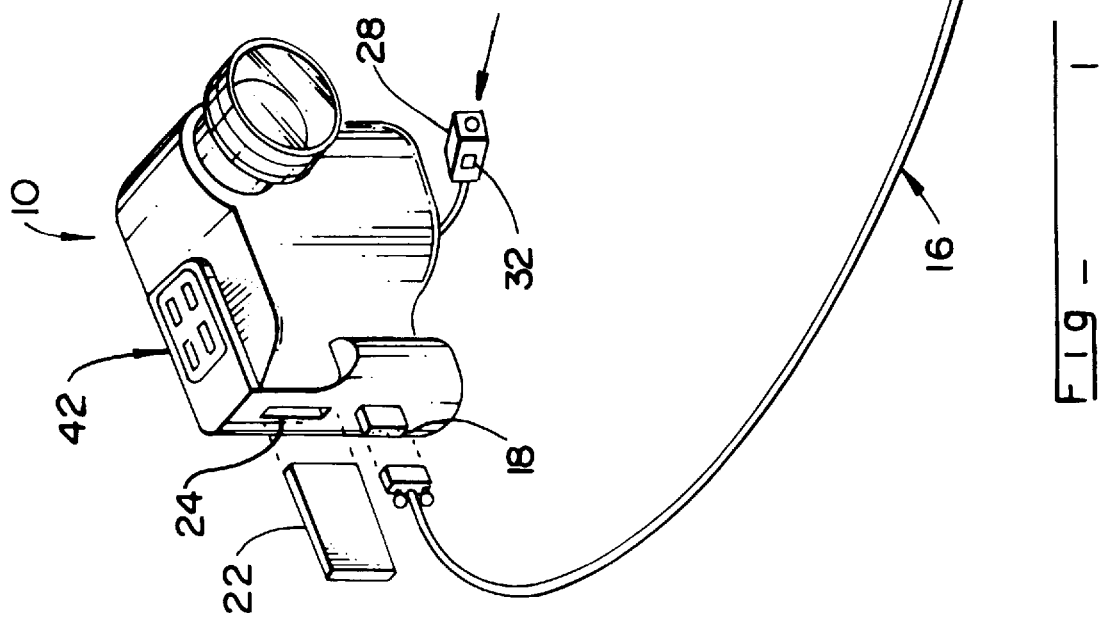

ORIGINAL IMAGE DATA

| | 1 | 2 | 3 | 4 |
|---|---|---|---|---|
| 1 | 1<br>10,5,18 | 2<br>12,7,24 | 3<br>14,10,30 | 4<br>16,12,40 |
| 2 | 5<br>50,100,30 | 6<br>40,80,40 | 7<br>25,7,8 | 8<br>6,15,12 |
| 3 | 9<br>15,1,80 | 10<br>70,3,2 | 11<br>45,10,50 | 12<br>74,80,9 |
| 4 | 13<br>11,12,13 | 14<br>70,0,0 | 15<br>0,70,0 | 16<br>6,13,80 |

Y COORD. OF IMAGE

X COORD. OF IMAGE

Fig-10

MODIFIED IMAGE DATA

| | 1 | 2 | 3 | 4 |
|---|---|---|---|---|
| 1 | 1<br>10, 5, 18 | 2<br>12, 7, 24 | 3<br>10, 10, 30 | 4<br>16, 12, 40 |
| 2 | 5<br>50,100,30 | 6<br>255,80,40 | 7<br>25,7,8 | 8<br>6,15,12 |
| 3 | 9<br>15,1,80 | 10<br>70,255,2 | 11<br>45,10,255 | 12<br>74,80,9 |
| 4 | 13<br>11,12,13 | 14<br>70,0,0 | 15<br>0,70,0 | 16<br>6,13,80 |

Y COORD. OF IMAGE 2

X COORDINATE OF IMAGE

FIG - 12

METHOD AND APPARATUS FOR IN-CAMERA IMAGE MARKING AND AUTHENTICATION

BACKGROUND OF THE INVENTION

1. Field of the Invention

The present invention relates generally to image authentication, and more particularly to a method and apparatus in a camera for non-destructively marking an image, and creating image authentication data in the process of image acquisition.

2. Brief Description of the Prior Art

The prevention of unauthorized use, and the related problem of authentication of documents and images is a problem that has been addressed in the past. In the area of unauthorized use, photographers need to display their images for potential sale in a condition that discourages use of the image prior to an agreement. Examples include stock-photography and image banks. In an attempt to prevent unauthorized use, a photographer may apply a mark (typically termed a "watermark") on a copy of the image to discourage its use. Even so, there is always the risk that someone may come in possession of the original. A particular problem exists in the field of digital photography where the concept of an "original" photograph is highly questionable, due to the capability of image modification.

In the area of authentication, a reliable money supply requires a method of authenticating the currency. Signatures on numerous types of documents require authentication, the efforts ranging from the use of a notary public for official documents to the showing of a driver's license to a store clerk. Picture identification is used in many areas, but generally lacks any means of assuring that the picture is in fact the person otherwise identified, for example on a driver's license or security badge/card. The problem with a picture I.D. is one of assuring that the picture on the card is the original. With no method of checking the image authenticity, false identifications can be produced by changing the image after the original picture is taken. A particular problem exists with modern digital photography which provides a user extensive and easy flexibility in modifying images through pixel manipulation, thus reiterating the problem previously cited concerning what is to be considered an original versus a modified or manipulated image. One method of authenticating an image is through physically marking an image in a manner that is very difficult to reproduce, such as an image that can only be viewed at a certain angle, as described in U.S. Pat. No. 5,468,581 by Coe, et al. U.S. Pat. No. 5,410,642 by Hakamatsuka et al. describes a method of manufacturing an I.D. card with embossing over a photograph and applying a code to the I.D. card. U.S. Pat. No. 5,420,924 by Berson et al. describes extracting a portion of information from a digital image and placing it on one side of an I.D. card with the photo on the other. The photo can then by checked for subsequent alteration by decoding the data on the reverse side and displaying and overlaying the resulting image with the photo to visually display discrepancies.

The disadvantage of the above methods of authenticating images is that they involve adding authentication indicators to an image or image data that already exists in a viewable form. These methods are used to check for subsequent alterations of the image. The problem with these methods is that any amount of time could lapse between the creation of the original image and the inclusion of authentication data, and they therefore provide no way of assuring the authenticity of the presumed original. In other words, there is no guarantee that the original image was not manipulated before the authentication marking was installed. Similarly, in the situation where a visible mark is placed on an image to discourage unauthorized use, existing methods that apply a mark to a copy for display run the risk that someone may obtain possession of the original.

There is clearly a great need for a method and apparatus for marking an image and creating authentication data at the time of acquisition of the image, by-passing the need to first create and store a viewable original that could be intercepted by unauthorized persons.

SUMMARY OF THE INVENTION

It is therefore an object of the present invention to provide a method of assuring the authenticity of an original image.

It is a further object of the present invention to provide a camera that creates data for image authentication in the process of acquiring the image.

It is a still further object of the present invention to provide software for authentication of an image.

It is another object of the present invention to provide a method and apparatus for marking image data inside a camera.

It is a further object of the present invention to provide for marking image data inside a camera and providing access to the original image through use of a password.

Briefly, a preferred embodiment of the present invention includes a camera with a built in microprocessor system programmed to receive an input password and indicium from a host computer. The camera is configured to use the indicium in combination with a conversion formula to mark an original acquired image in a non-destructive manner to form modified image data and add the indicium to an image header. The camera also creates image authentication data for comparison with corresponding data of a questionable second image to determine if the second image is the same as or different from the original image. This process of marking and creating authentication data all occur during acquisition and prior to any image data storage in a medium from which a person could subsequently access data. The camera then stores the authentication data along with the marked image data in memory for subsequent transmission to the host computer. The preferred embodiment of the authentication involves the creation of checksum data, involving the addition of pixel values from each image row and each image column. These sums are then stored in a lookup table for future use in comparing with the result of the same checksum calculation done on questionable image data at a future time. The original image can be viewed only through presentation of the password.

An advantage of the present invention is that the authentication data is created during the process of image acquisition inside a camera, prior to any opportunity for manipulation of the image data.

A further advantage of the present invention is that an original image is marked during the process of acquisition inside the camera prior to any opportunity for viewing the image.

A further advantage of the present invention is that the original image can only be viewed through presentation of a password, which makes it practically impossible for an unauthorized person to view the original image, the ability to decipher or eliminate the mark being limited only by the sophistication of the encryption method and by the complexity of the authentication method.

Another advantage of the present invention is that it provides marked, secure images that can be used for sales promotion minimizing concerns regarding unauthorized use.

IN THE DRAWINGS

FIG. 1 illustrates a camera system according to the present invention;

Figure 3:
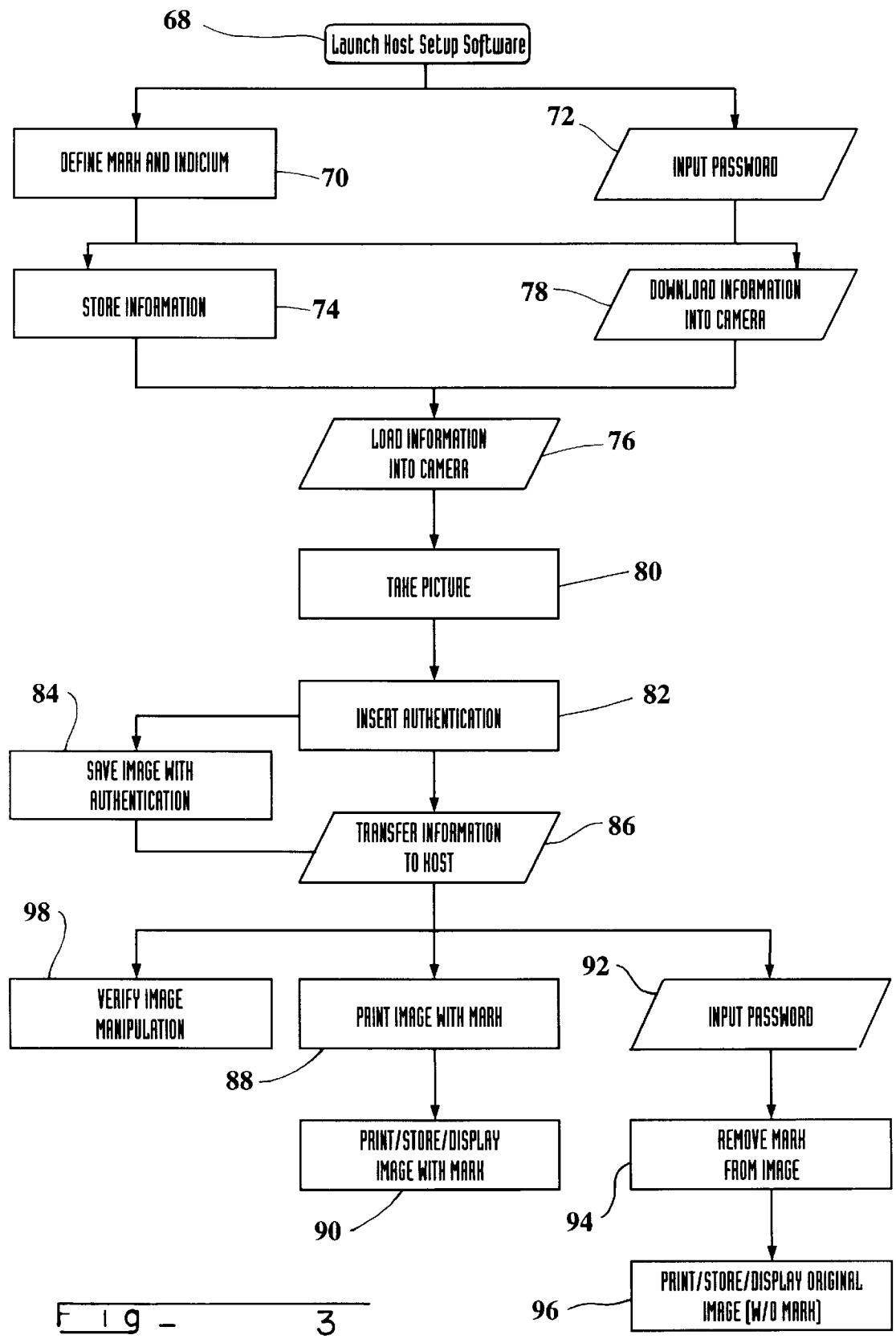
FIG. 3 is a detailed block diagram of the system of FIG. 1 according to the present invention.
Figure 9:
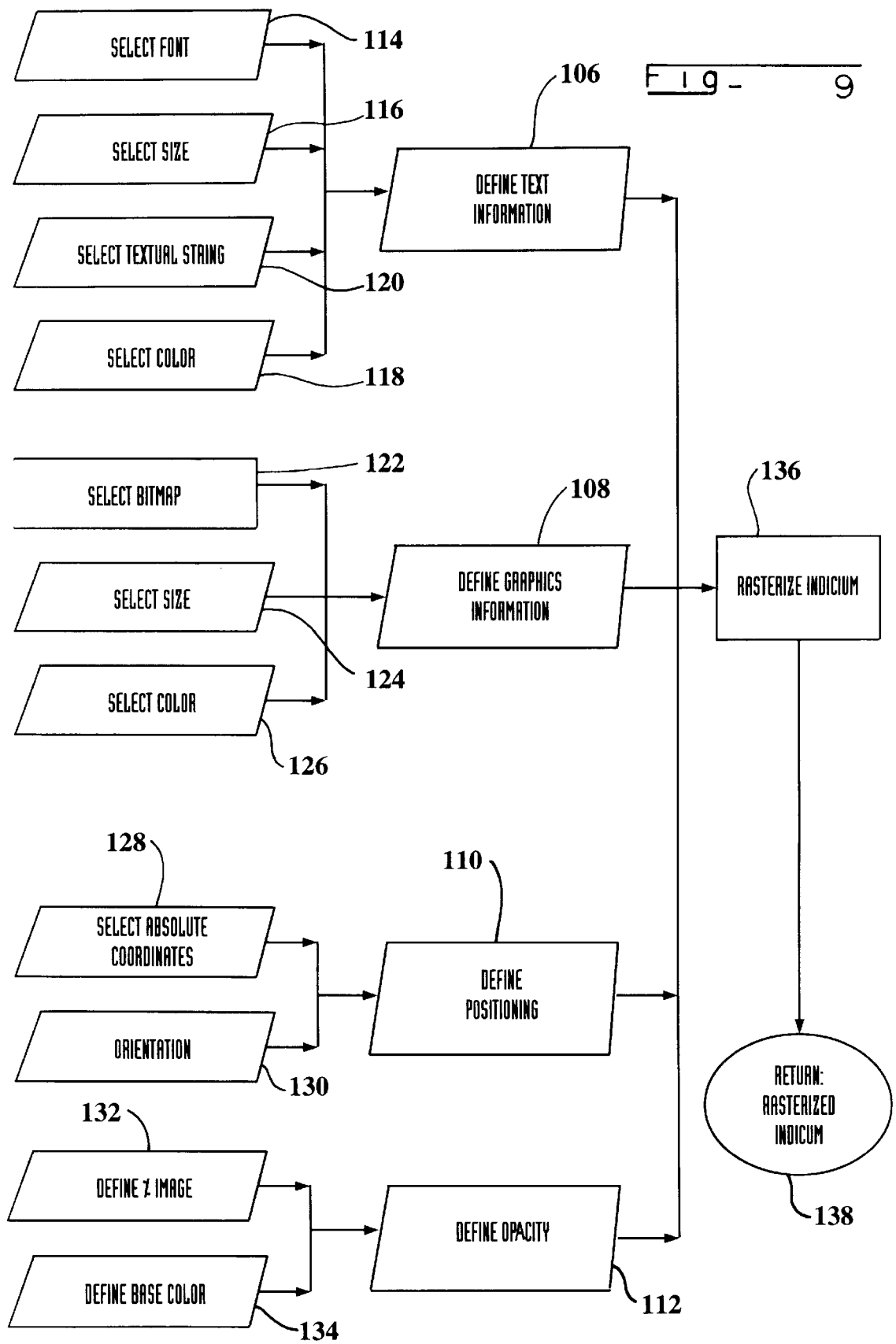
Figure 11:
Figure 13:
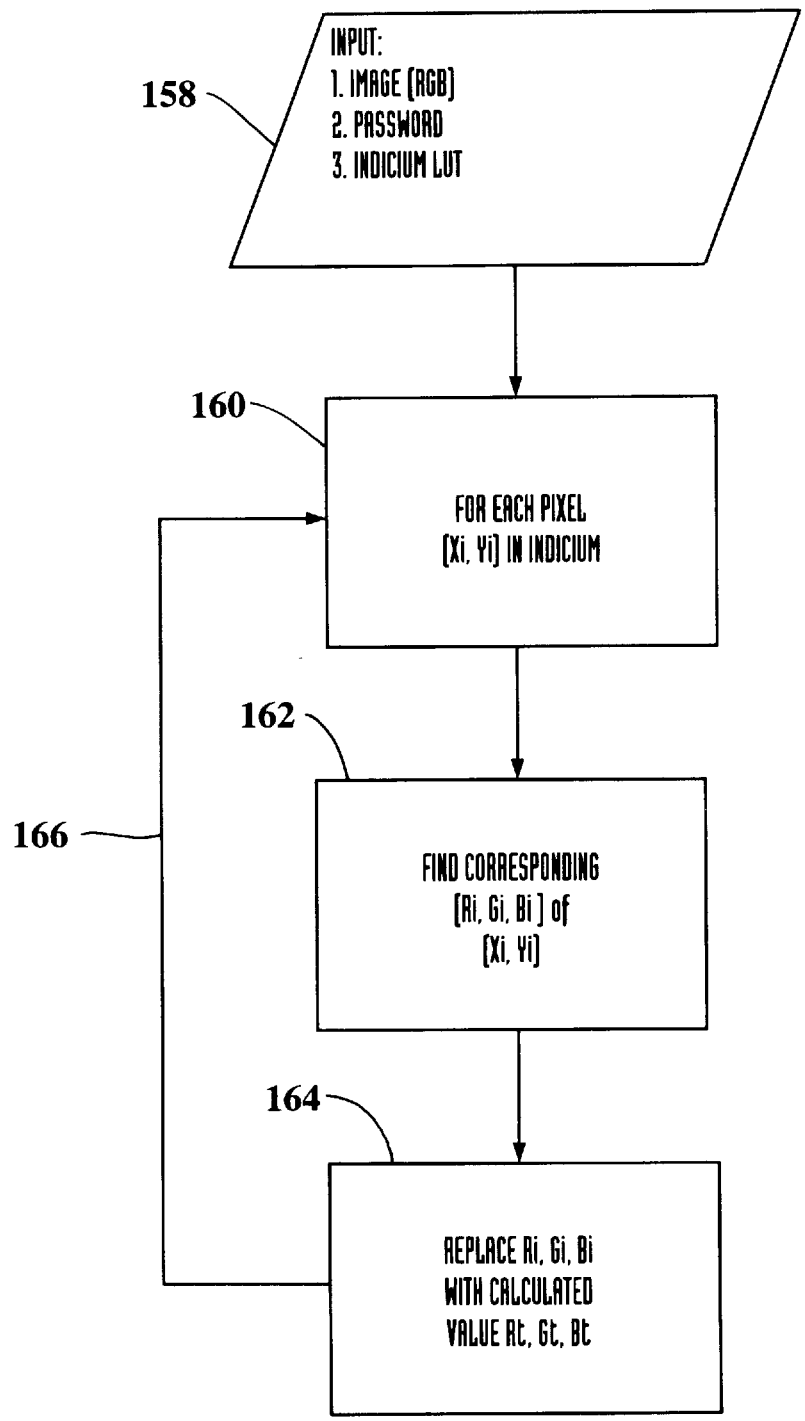
Figure 14:
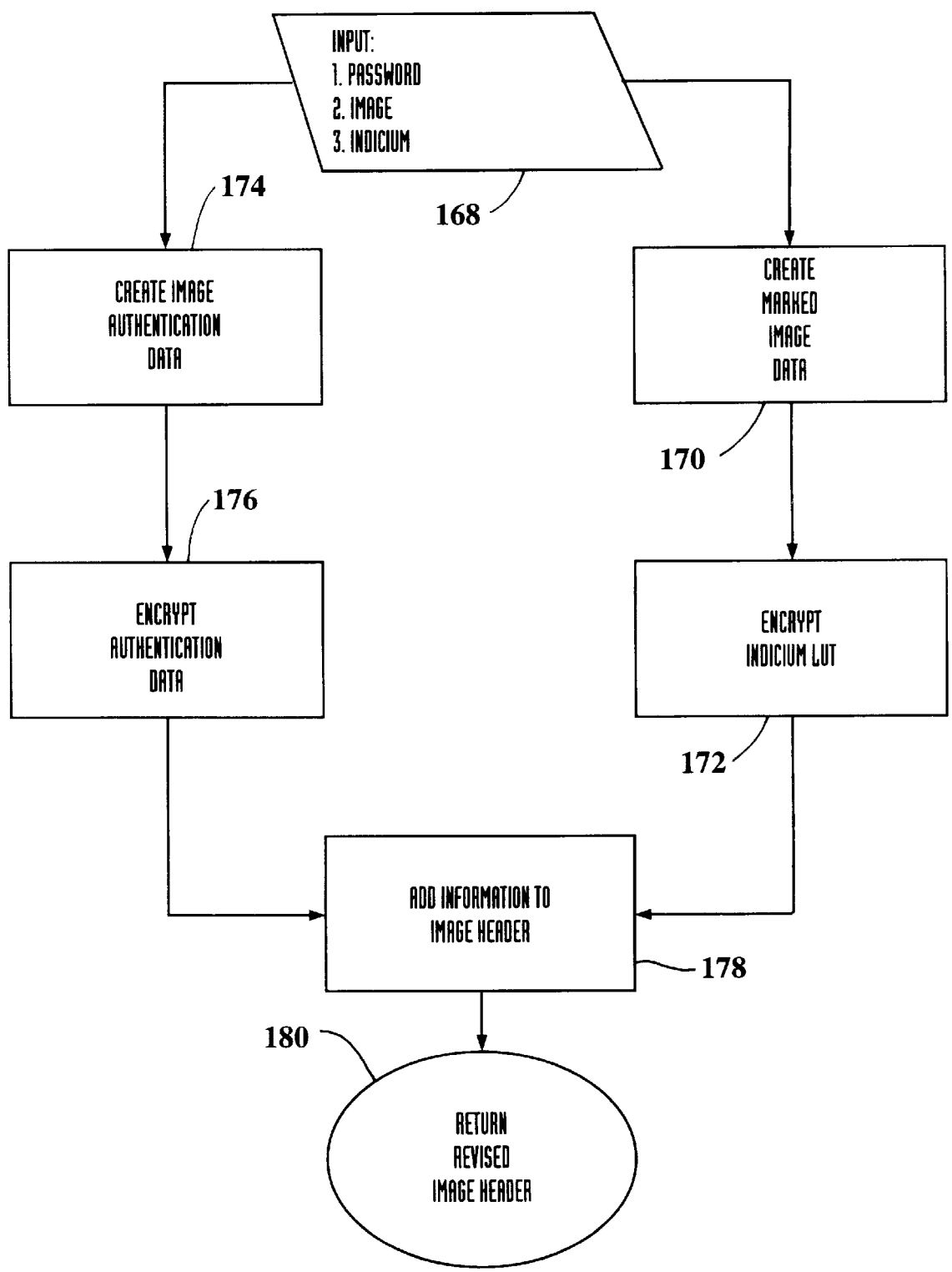
Figure 15:
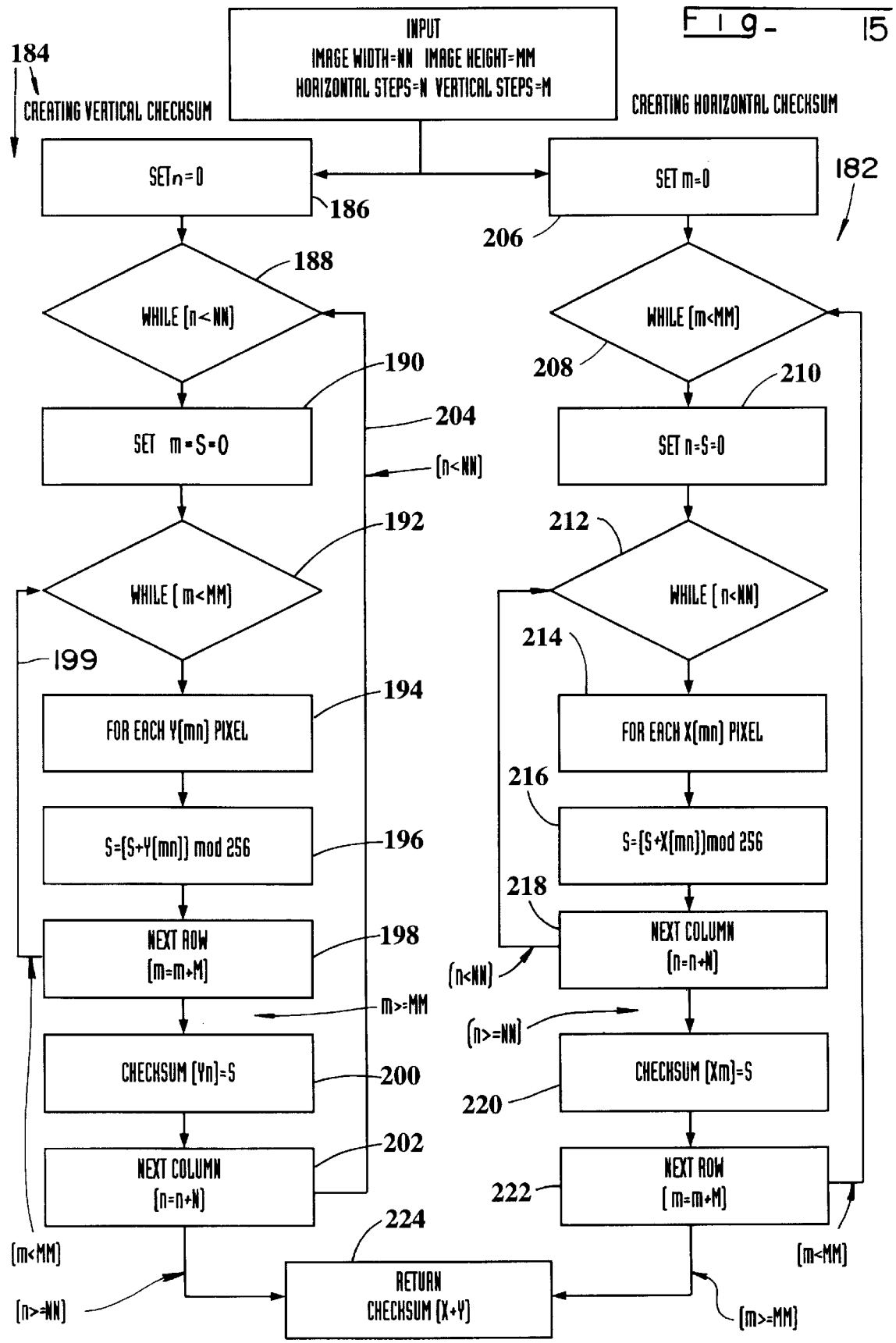
Figures 16, 17:
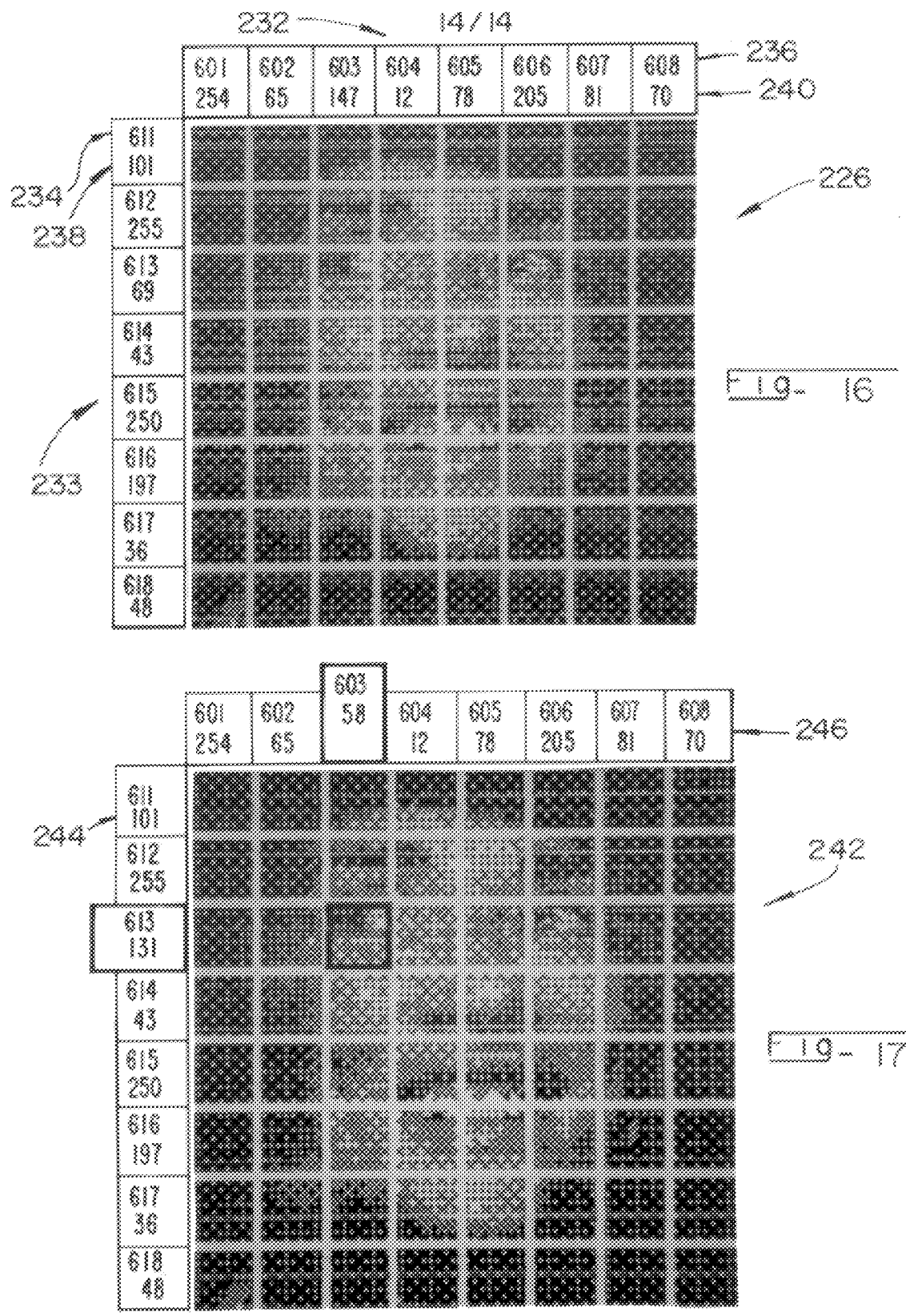

FIG. 9 demonstrates the creation of a mark;

FIG. 10 is an illustration of a simplified array of three-color pixel data;

FIG. 11 is a table showing the conversion of image data to modified image data through the use of the indicium;

FIG. 12 is a simplified illustration of the indicium modified image data of FIG. 9;

FIG. 13 is a block diagram showing the process of converting image data to indicium modified image data;

FIG. 14 is a block diagram showing further details of the processes involved in the authentication block 82 of FIG. 3;

FIG. 15 is a block diagram illustrating a method of creating a check sum;

FIG. 16 shows an original image divided into groups of rows and columns with authentication data noted; and FIG. 17 shows an altered image divided into groups of rows and columns with authentication data noted.

DESCRIPTION OF THE PREFERRED EMBODIMENT

Referring now to FIG. 1 of the drawing, there is an illustration of the operation of a camera and system according to the present invention. There is a camera 10, a host computer 12 and a printer 14. A variety of means of communication between the camera 10 and computer 12 are shown including a cable assembly 16 interconnecting the camera 10 and computer 12 through connectors 18 and 20. Communication can also be accomplished through use of a disk 22, such as a PCMCIA card for use with card/disk slots 24, 26. Radiated signals can also be used for communication as indicated by transceivers 28, 30. In addition, information can also be transferred through connections 32, 34 to a modem for transmission through a telephone system. The computer 12 is shown interconnected with the printer 14 by way of cable assembly 36 and connectors 38, 40.

The camera is constructed and configured for non-destructive marking of an original image, and for creating image authentication data from the original image. The overall system process begins with the creation of indicium and a password through use of the host computer 12. The indicium and password are downloaded to the camera where the indicium is used by the camera in combination with a predetermined formula to modify the original image data, i.e. to mark the original image so as to deter unauthorized use. The indicium and password are downloaded to the camera 10 by any of the methods of communication discussed above. Upon acceptance of the password and indicium, and in response to operator activation, the camera 10 acquires an image and creates original image data, which is then modified as part of the acquisition process to marked image data according to the indicium supplied from the host computer and a pre-determined formula. The indicium and formula can then be encrypted and stored in an image header for later transfer to a host computer for use in reconstructing the original image upon presentation of the password. Alternatively, a mark lookup table can be prepared that contains the address and pixel color values for each pixel replaced according to the indicium. This table can then be encrypted as stored in the image header for later downloading to a host computer for reconstruction of the original image, upon presentation of the password.

The camera 10 also creates image authentication data, which in the preferred embodiment is a checksum consisting of data in the form of a checksum lookup table (LUT). The authentication data is created from the original image data for the purpose of comparing with and proving the authenticity of any questionable subsequent image or i.e., second image data. The authentication data and indicium and formula (or mark lookup table) are then encrypted by the camera 10 to form encrypted authentication data and encrypted indicium and formula (or encrypted lookup table) which are included as a "header" to the marked image data, and upon user command are downloaded with the marked image data to the host computer 12.

There are many ways authentication data can be prepared from original image data. All or part of the image data can be modified according to any of a wide range of formulas and the results stored for comparison with corresponding data of a questionable image to determine if it is the same or different from the original. The spirit of the present invention includes all of these many ways that will be apparent to those skilled in the art.

Upon receipt of the encrypted authentication data, encrypted indicium and formula (or encrypted lookup table), and marked image data at the host computer, an operator can print the marked image or store or display it. Upon input of the password, an operator can successfully instruct the computer to remove the mark and display the original image. The authentication data is used by the host computer to determine if a questionable second image is the same as the original image. In order to do this, the host computer performs an authentication data calculation on the second image and compares the resulting second authentication data with the (first) authentication data of the original image. The authentication data operation of the preferred embodiment (checksum) will also show where the two images differ. This will be fully explained in the following descriptions at the various figures of the drawing.

Figure 2:
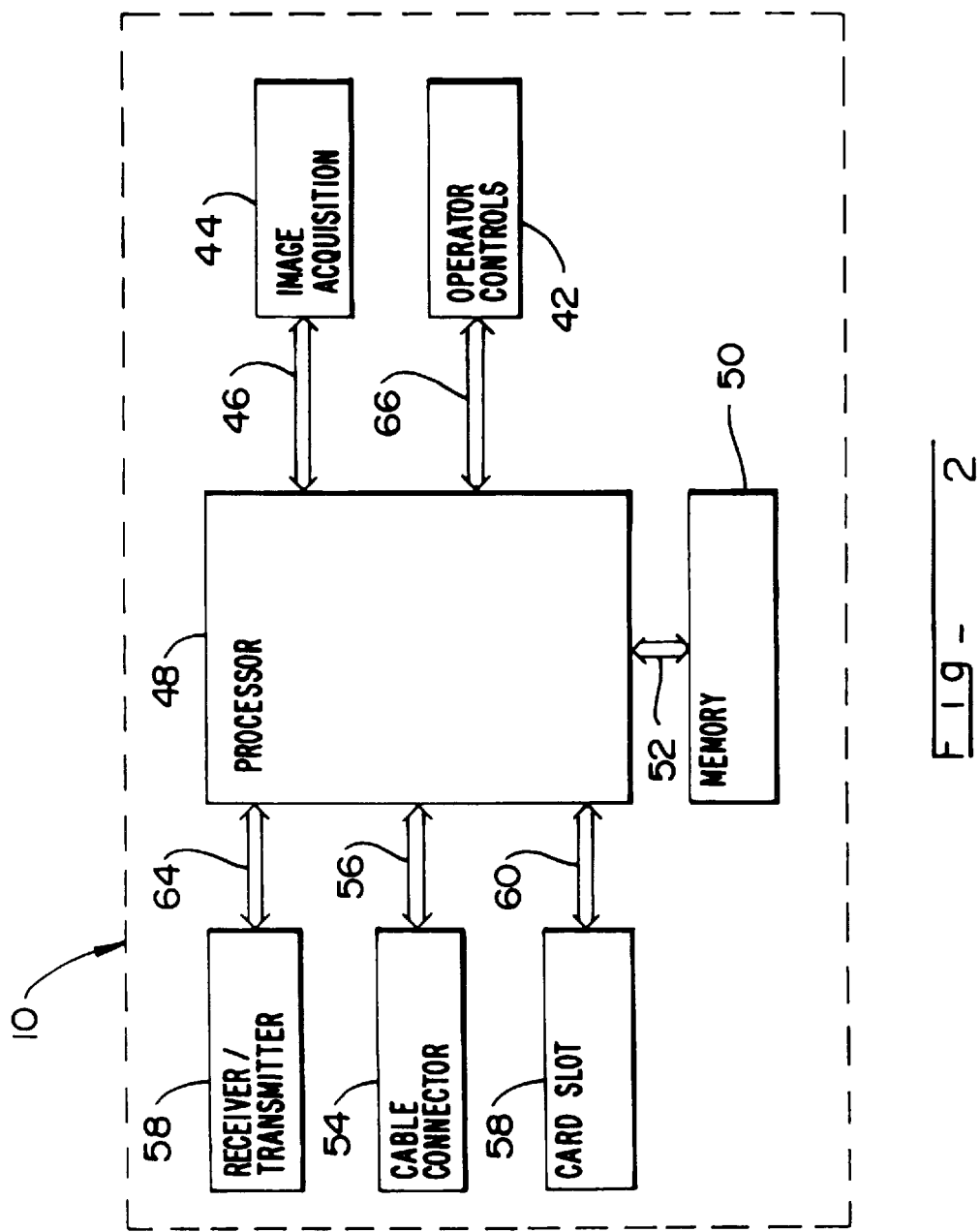
FIG. 2 is a block diagram of major camera parts.

FIG. 2 shows a block diagram of the major operational portions of a digital camera. These include an image acquisition apparatus 44 in communication through bus 46 with a processor 48. The processor by way of bus 52, stores data in memory 50, which also includes ROM memory for basic operations. Input and output of data is through one of the various means described above, including a cable connector 54 through bus 56, card/disk slot 58 through bus 60, transceiver 62 by way of bus 64, or modem connection (not shown in FIG. 2). Controls 42 are shown connected to the processor by way of bus 56.

The image acquisition apparatus 44 includes components well known to those skilled in the art and need not be shown in detail in order to practice the invention. The acquisition apparatus 44 includes an image optical pickup, such as a charged coupled device (CCD) and A/D circuitry to convert the analog CCD signals to digital form for the processor 48.

The original image data is temporarily stored in registers, for example in processor 48, and accessed and processed in increments. The registers are secure, do not provide long term storage or a residual memory that is accessible by a person to extract the contents. The camera extracts the data from the registers and converts it through use of the indicium and formula to marked image data, and as above mentioned a mark lookup table alternatively created with the addresses and color values of the original image pixels modified by the mark. The lookup table (or indicium formula) is then encrypted and stored in memory. According to the above description, the placing of a mark on an image is accomplished in a continuous sequence/process that can be properly described as part of the image acquisition process. The marked image data and encrypted lookup table (or encrypted indicium) are then stored in memory 50.

In a similar manner, the original image data is extracted in increments from register to create the authentication data, which is then encrypted to form encrypted authentication data. The secure encrypted authentication data is then stored in memory 50. The encrypted authentication data, encrypted lookup table (or encrypted indicium and formula), are then placed in a "header" to the marked image data, which can be downloaded to the host computer where the marked image can be viewed, and upon presentation of the password, the mark lookup table (or indicium and formula) can be accessed and the original image recreated and viewed.

The encrypted authentication data is similarly accessible upon presentation of the password to allow the evaluation of a questionable image to determine if it is the same as the original. Alternatively, the authentication data can be transferred to the host computer in unencrypted form, not requiring the password for use.

Referring now to FIG. 3, there is illustrated a more detailed block diagram of the processes performed by the camera and system of FIG. 1. According to block 68, the host computer is loaded with "set up" software allowing an operator to create a mark and corresponding indicium (block 70) and a password (block 72). This information is either saved (block 74) and later downloaded (block 76), or directly downloaded (block 76, 78) to the camera 10. Block 80 indicates the camera's acceptance of the password, as well as the operator activation of the camera and the subsequent image acquisition process including converting analog image data to digital data. Block 82 involves the processes of converting the original image data according to the indicium (indicium data) to place the mark on the original image, i.e. to form marked image data. Block 82 also includes encrypting the indicium and formula, creating the mark lookup table, and an encrypted mark lookup table and includes the process of creating image authentication data from the original image. The authentication data is calculated from the original image data for use in comparing with the same calculation of corresponding data of questionable subsequent or i.e., second image data in order to determine if the subsequent image data is the same as the original data. The preferred embodiment of authentication data is a checksum consisting of a table containing the sum of data in each row and column of the original image data. Block 82 also includes encryption of the authentication data to create encrypted authentication data.

Block 84 indicates the process of saving the encrypted authentication data, marked image data and encrypted mark lookup table. The encrypted authentication data and encrypted mark lookup table (or encrypted indicium and formula) can be placed as a header to the marked image data. Block 86 indicates the process of transferring the data to the host computer.

Once the above data is transferred to the computer, the operator can display, print or store the marked image (blocks 88, 90). Upon input of the password (block 92) the mark can be removed (block 94) and the original image can be printed, displayed or stored (block 96). The operator can also compare the original authentication data with the authentication data of a subsequent image (block 98) to determine if the subsequent image is different from the original.

Figures 4, 5:
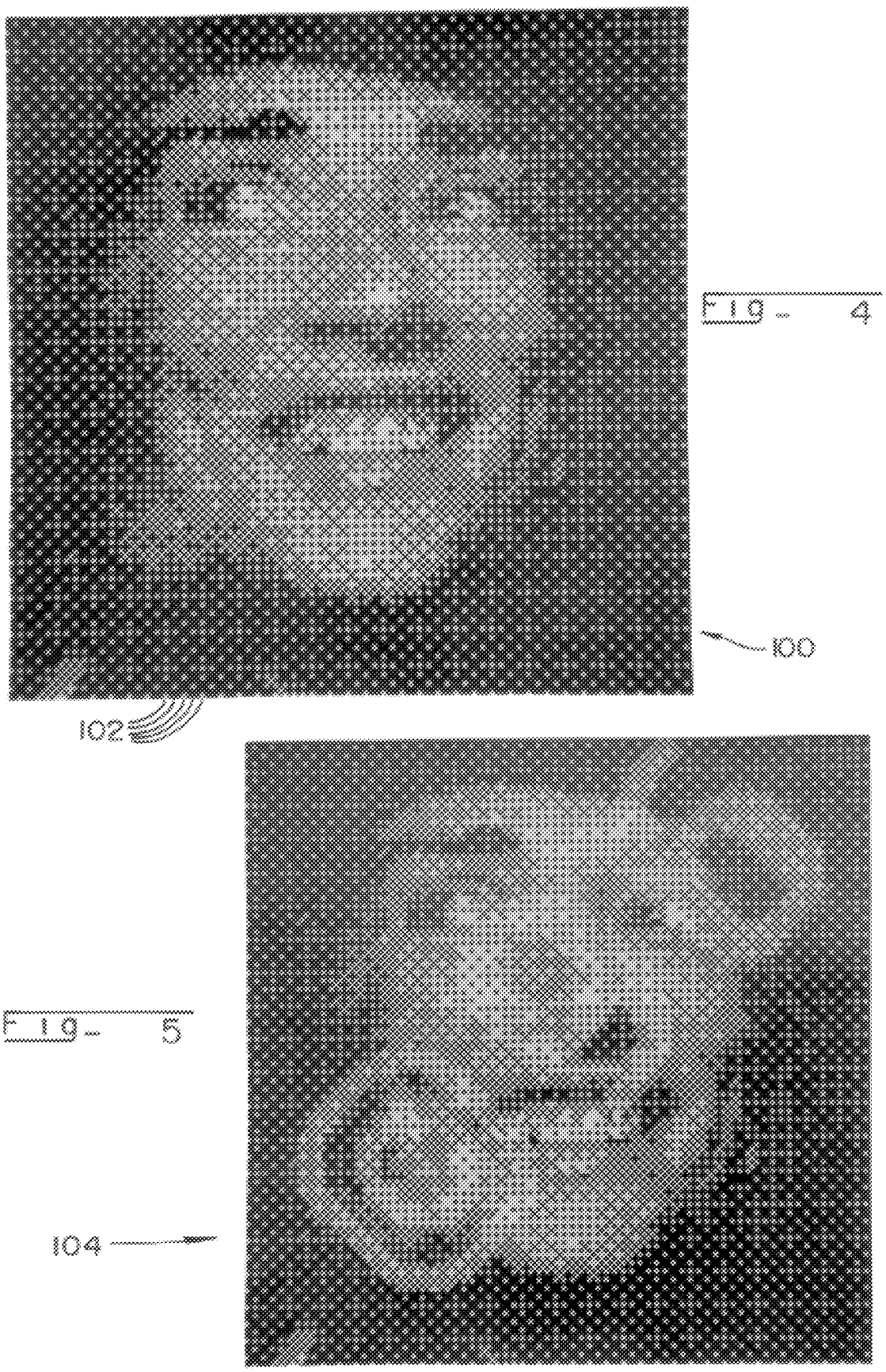
FIG. 4 is a bitmap illustration of a digital image captured by a digital camera.
FIG. 5 is an illustration of the digital image of FIG. 4 with a 50% opacity watermark superimposed thereon.
Figure 6:
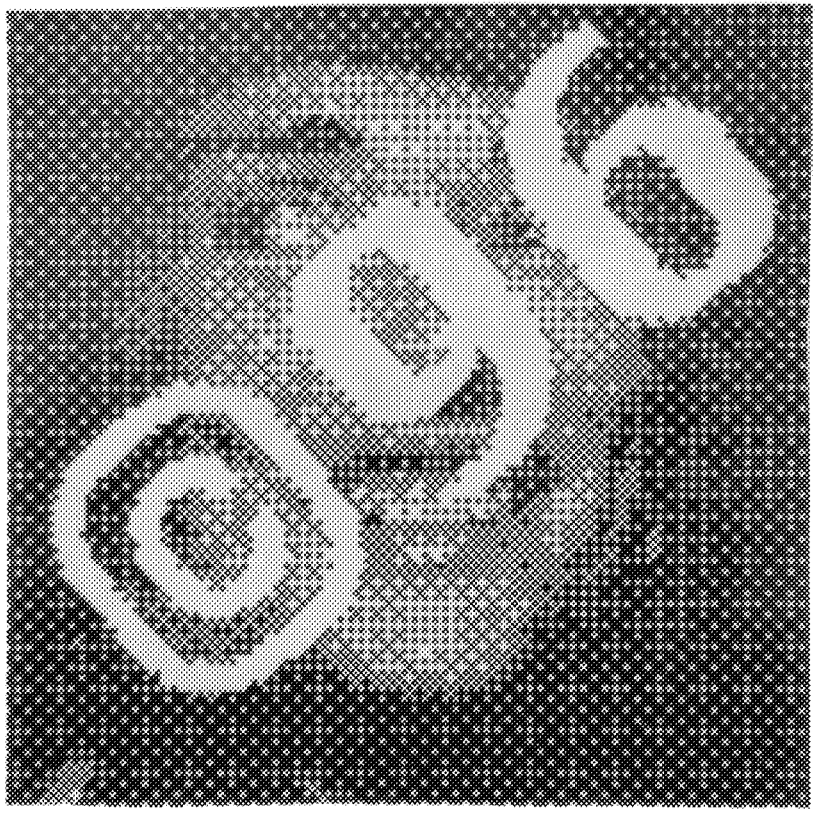
FIG. 6 is an illustration of the digital image of FIG. 4 with a white watermark.
Figure 7:
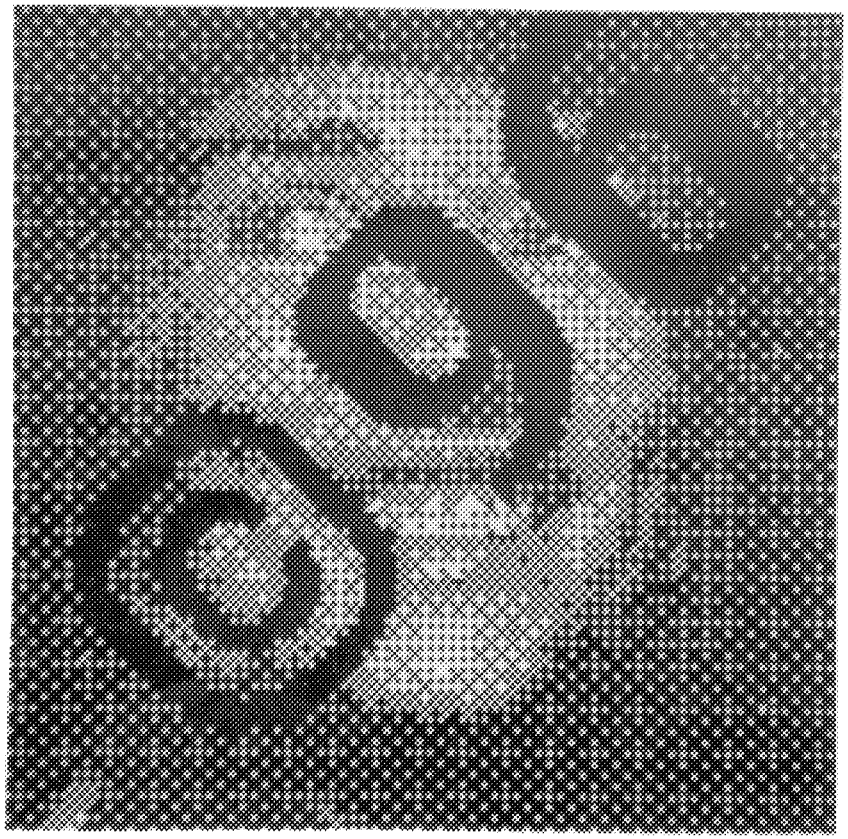
FIG. 7 is an illustration of the digital image of FIG. 4 with an all black mark.
Figure 8:
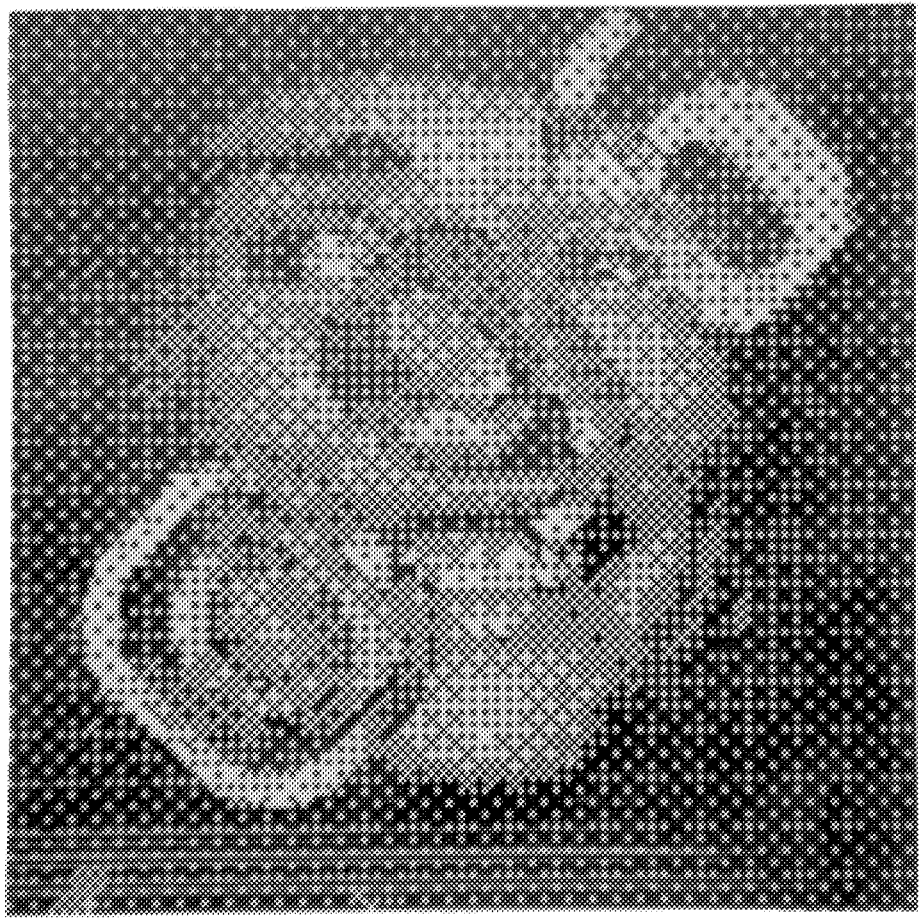
FIG. 8 is an illustration of the digital image of FIG. 4 with a "negative" mark.

FIG. 4 illustrates the concept of a digital image 100 as an array of pixels (picture elements) 102, each square representing one pixel. In this figure, each pixel is represented as a "bitmap", i.e. either "on" (white) or "off" (black). Actually, in the case of color photography as described in the following figure, each pixel represents three outputs, one each for red, blue and green, each output providing a multitude of levels (for example 256 shades for each color). The squares in FIG. 4 are large for ease of illustration. Similarly, FIG. 5 illustrates the concept of putting a mark on an image to create the marked image data 104, which as shown has an opacity of 50%. In this case a "circled C" (copyright) followed by a "9" and a "6" is imposed on the original image to create the marked image data 104. Such a mark is conventionally referred to as a "watermark". Similarly, FIG. 6 illustrates an all white mark, FIG. 7 illustrates an all black mark, and FIG. 8 represents a negative mark. The table of conversion elements used to convert from original data to the marked data is termed "indicium", the elements acting on the red, green and blue content of each pixel, and the pixel opacity.

The indicium can be created to provide a mark that is all black, all white, a shade in between, or each pixel of the mark can be a negative of the original pixel data, as well as many other conversions, for example including the multiplicity of colors that will be apparent to those skilled in the art.

FIGS. 5 and 6, for example, illustrate the same basic mark (watermark) with the same base color (white) and different opacity. In FIG. 5, the watermark is 50% opaque, while in FIG. 6 it is fully opaque. Base color means the color of the mark, for example all white as in FIG. 6, or all black FIG. 7. FIG. 8 illustrates an alternative to the method wherein the watermark is defined as the negative of the image at 100% opacity.

FIG. 9 illustrates the various items that need to be defined in the creation of the indicium from which the camera creates the mark, in cooperation with a formula, which will be fully explained in the following. Text 106, graphics 108, positioning 110 and opacity 112 information need to be determined. The text information includes the selection of font 114, size 116, color 118 and the selection of a textured string 120. The graphics 108 information includes the selection of a bitmap 122, a size 124 and a color 126. Positioning 110 requires determining the coordinates 128 and orientation 130 of the mark on the original image. The opacity 112 involves determining what percentage 132 of each original image pixel color or, i.e. shade is to be modified. A 100% change means that no original image data is retained. Base color (134) means the color of the mark, or for example all white (as FIG. 6) all black (FIG. 7) or the negative (FIG. 8).

Block 136 indicates the need to put the pixels to be modified in an array or i.e. look up table, the operation being termed "rasterize".

The preparation of the indicium and its use to create marked image data is perhaps best explained with an over simplified example that can be easily displayed. Suppose that the array of FIG. 10 represents original image data consisting of a 4×4 array of 16 pixels. The X coordinates 140 and Y coordinates 142 of each pixel are noted, and the pixels are given numbers 144 from 1 to 16, which are positioned in the upper left corner of each square representing a pixel. A set of three color numbers are placed in each square indicating the color of the pixel. The first number indicates the intensity of the red content, the second green, and the third blue.

In order to place a mark on the image represented by FIG. 10, the indicium is received from the host computer, and used with a formula or, i.e. a conversion equation to calculate a new set of color numbers.

The formula and indicium can be of various designs and each design can potentially be used to accomplish any number of different marks. One of the simplest of these would be a first lookup table prepared at the host computer containing the address, color value and opacity for each pixel of a mark. The camera could then simply replace the corresponding original image pixel values and those of the mark, and create a mark lookup table containing the values of the original image data for the pixels in the mark. The mark lookup table, as explained above could then be encrypted and placed as a header to the marked image data. In such a simple case, the indicium would be the values of the pixels in the mark, and the conversion equation would simply equate the color values of the pixels in the mark with those of the indicium/mark. More complicated transformation can also be used, such as the one illustrated in FIG. 11, where column 148 gives the pixel number, column 150 gives the pixel coordinates and column 152 gives indicium numbers 154, the numbers indicated symbolically by the letters Rd, Gd, Bd and Op. These numbers are used in a conversion equation (formula) to operate on each pixel of the original image to create the marked image data. The same numbers and equation can be later used by the host computer, upon receipt of the correct password, to calculate the original image data from the marked image data. Rd is a number used to calculate the marked image red content, and Gd and Bd are similarly used for green and blue. The value Op is a number representing opacity, i.e. how much original image color is allowed to be retained in the particular pixel. Alternatively, a complicated formula could be used to create the mark, and a simple lookup table could be used to remove it, or vice versa. In addition, the watermark or its formula can be hidden within the image data. All of these possibilities fall within the scope of the indicium and formula/equation concept, and are included in the present invention.

A complicated conversion equation can provide greater security. In order to "break" the code, a person would have to somehow determine both the conversion lookup table and the formula/conversion equation. The spirit of the present invention includes any combination of conversion table numbers and conversion equation. The particular conversion equation used in FIG. 11 is:

Rt=round (the smaller of {255, (Ri+Rd) * Op})

The processor 48 uses the equation (formula) and the indicium values in the conversion LUT (column 152) of FIG. 11 to operate on the original image data of FIG. 10, which is listed in FIG. 11 column 154, to calculate the marked image data listed in FIG. 11 column 156. For completeness of description, this modified data is shown in array form in FIG. 12, the pixel data being the same as in FIG. 10 except where modified by the conversion equation and indicium for pixels 6, 10 and 11. For easy comparison, these are listed in FIG. 11 column 156, which shows that the only pixels modified are 6, 10 and 11 forming an L shaped mark on the original image.

The block diagram of FIG. 13 summarizes a preferred method of creating the marked image data, wherein the processor operates only on the pixels indicated as being part of the mark. For example, in the case of FIGS. 10–12, the only pixel in the conversion LUT would be pixels 6, 10 and 11 of the "L" mark. In FIG. 13, block 158 indicates the processor 48 receiving a "password", which if correct begins the conversion operation. Block 158 also indicates the input of the original image data and the indicium LUT. According to block 160, a pixel in the indicium (the mark in the preferred embodiment) is selected, and per block 162 the corresponding image color data is accessed. Block 164 then indicates the replacement of the original image data Ri, Gi, Bi with the marked image data Rt, Gt, Bt. The process is then repeated until all of the pixels in the mark/indicium are replaced; the repetition indicated by arrow 166. Although the simple example uses a mark, (the "L" defined by pixels 6, 10, 11), the indicium can be prepared to operate on any percentage of the pixels of the original image, including 100% of them, to create any desired modification of the original image and this in included in the present invention.

The overall operations of image authentication indicated by block 82 in FIG. 3 are more completely described in block diagram form in FIG. 14. The necessary inputs are noted in block 168, and include the image from which the image data are created, the password, and the indicium or i.e. indicium LUT. Block 170 has to do with the creation of the indicium modified image data. The indicium are then encrypted (block 172) as part of the security process since the indicium, along with the conversion equation are necessary for conversion of the image from original to modified (marked) and back again.

The password (block 168) is also needed to initialize the process of decryption of the encrypted indicium lookup table (LUT) when the original image is to be restored through use of the host computer.

Block 174 of FIG. 14 involves the creation of the authentication data, which is a set of data calculated from the original image data and set apart as an authentication lookup table to compare with a subsequent image as an overlay to check for any possible alternations in the original image. The authentication data may also be encrypted, as noted by block 176, or it can alternatively be transferred to the host computer without encryption. The encrypted or unencrypted authentication data and encrypted indicium are then placed in a file as a header to the marked image data. This is noted in blocks 178 and 180, and the "return" of block 180 indicating saving "in-camera" (block 84 of FIG. 3) and/or transferring to a host computer (block 86 of FIG. 3).

The creation of the authentication data can be done in a number of ways. More complex methods will ensure tighter security as well as minimize the random possibility of an altered image that will not be indicated by the authentication data. Like the conversion equation, the spirit of the invention includes the many ways authentication data can be created. The basic idea is to sample, all or part of the image data and encrypt it or i.e., modify it in some way and store it for future reference in order to compare with the results of the same calculation performed on a later image to see if the later image is the same or different from the original.

The preferred embodiment of the authentication data is checksum data prepared by simply adding the color numbers of selected groups of rows and columns of the original image data, and storing these values in a LUT for comparison with the results of the same addition procedure performed on a questionable image to be compared with the original. The number of rows in a particular group can be one or more, and each group can have either the same number of rows or a different number.

A particular embodiment of a checksum calculation is illustrated in block diagram form in FIG. 15, which shows a series of blocks 182 for adding pixel color values of rows of pixels to create horizontal checksums, and a series of blocks 184 for adding pixel color values of columns of pixels to create vertical checksums. The letter "n" in FIG. 15 is used to indicate the number of a column. The letter "m" is used to indicate the number of a row. The mth pixel in column "n" is designated $Y_{mn}$. Similarly, the nth pixel in row m is designated $X_{mn}$. The use of both X and Y to identify a pixel is to distinguish between row addition versus column addition. In fact pixel $X_{mn}$ is the same as pixel $Y_{mn}$, for example $X_{23}$ is the pixel in the second row down and third column to the right which is the same pixel as $Y_{23}$ which is the pixel in the third column to the right and second row down. The total number of rows (image height) is designated MM, and the total number of columns (image width) is designated NN. In the example of FIG. 15, the procedure steps vertically by the number M i.e. each Mth row is selected, and steps horizontally by the number N i.e. each Nth column is selected.

A detailed description of the creation of the vertical checksums will now be given. Block 186 indicates setting the column indicator "ln" to zero. A large loop is then indicated by decision block 188, decision block 202 and return 204. Block 188 and return 204 indicate that the process continues as long as n is less than the total number of columns NN. Each pass around the loop processes a new column as indicated by block 202 which steps the column number n to "n+N", incrementing it by N. N can be a selected number greater than or equal to 1, but less than NN. Smaller values of N give finer resolution, and result in a more accurate checksum. Block 190 sets the row number m and the total checksum S for the column, equal to zero. Blocks 192–198 and return 199 indicate the addition of the color values of each selected pixel in the column n as the particular pixel Ymn in the column is selected by incrementing the row number m by the increment value M. Block 192 indicates that the loop continues until the row m is greater than or equal to MM. Block 194 indicates the particular pixel Ymn being added, and block 196 indicates the actual addition of the new pixel value $Y_{mn}$ to the sum S. This operation is done for each of the three color values, the figure indicating the process for any color. Block 198 increments to the next selected pixel in the column by incrementing the row number m by the increment value M. Path 199 indicates the continuous operation of blocks 192–198 until the row number m is greater than or equal to MM. At this point the total checksum "checksum(Yn)=S" for the column n will be stored, or encrypted and stored, the process indicated by block 200. Block 202 then indicates the selection of the next column by incrementing n by the value N. The method of summing indicated in blocks 196 and 216 may need further definition. A preferred method of summing involves truncation in order to limit the size of numbers, as indicated in blocks 196 and 216. For example, "Mod 256" means that the register counts to 255 and then wraps around back to "0", similar to the decimal system which counts from 1 to 9 and then shifts back to "0", maintaining only the last digit. For example, 256 mod 256 would be "0", 257 mod 256 would be "1", 513 mod 256 would be "1".

The calculation of the horizontal checksums by blocks 182 is exactly the same procedure as for the vertical checksums, except the blocks 206–222 have the appropriately different row and column designations as indicated for row addition. Since the operation is otherwise the same as for the vertical operation, a detailed recitation of the block functions is not needed.

Block 224 indicates the storing of the checksums or encrypted checksums. In the preferred embodiment, the checksums or encrypted checksums would be placed in an image header.

Alternatively, or in addition to the storing of selected rows and columns, the total color value sums for selected pixels of the whole array can be added. The resulting set of three color numbers (R, G, B) can then be compared with the corresponding sums for a questionable/second image to indicate if the second image is the same as the first. If the sums for the two images are different, it proves conclusively that the second image is different from the first. On the other hand, if the sums are the same, the test is only an indication that no changes have occurred and not conclusive since one pixel could be increased and another decreased by the same amount. Authentication data involving individual row and column sums are preferred because they give a more accurate check, and can also tell where a particular defect or alteration has occurred, the defect occurring at the intersection of the row and column, or groups of rows and columns, that are in deviance.

As discussed above, other authentication data calculation methods can be performed on an original image to create data to check an image for authenticity. The various calculations, which will be apparent to those skilled in the art, will all be referred to as authentication data herein and in the claims, except in description of the preferred "checksum" embodiment.

A method of using row and column authentication data to find the location of an image alteration is illustrated in FIGS. 16 and 17. The method includes performing calculations according to a pre-determined formula on rows of pixels or groups of rows, and columns of pixels or groups of columns. For example, FIG. 16 shows an original image 226 divided into groups of rows of pixels such as 228, and groups of columns of pixels such as 230. From within each group, authentication data can be prepared. The calculation can be of any form, as previously described, and need not involve all of the individual rows or columns of pixels within a group. Furthermore, the groups do not have to be of uniform size.

The resultant authentication data can be used to locate the area of an image alteration, the exactness of location dependent on the size of the groups. The boxes 232 along the top, and boxes 233 along the left side of the image contain row numbers 234 and column numbers 236. The numbers 238 below the row numbers 334 define a first set of row authentication data, and the numbers 240 below the column numbers 236 define a first set of column authentication data.

FIG. 17 shows an image 242 which is the image 226 of FIG. 16 in an altered form. The location of the alteration can be observed by comparing the second set of row authentication data 244 with the first set of data 238, and the second set of column authentication data 246 with the first set of data 240. The intersection of a row of the second set of row data and a column of the second set of column data that both differ from the corresponding row of the first set of row data and first set of column data, defines the area 248 of the image where an alteration exists. In the example of FIG. 17, it can be seen that the authentication data for column 603 of the original image is 147, whereas the corresponding authentication data for column 603 of the altered image is 58. Comparing the row data shows that the data for row 613 was altered from 69 to 131. Since the other data was not altered, the alteration is confined to the area 248 defined by the intersection of row 613 with column 603.

Although a preferred embodiment of the present invention has been described above, it will be appreciated that certain modifications or alterations thereon will be apparent to those skilled in the art. It is therefore requested that the appended claims be interpreted as covering all such alternations and modifications which fall within the spirit and scope of the invention.

What is claimed is:

1. A method of image authentication using a digital camera comprising the steps of:
   (a) initializing an authentication system in the digital camera with a user programmable encryption password;
   (b) acquiring original image data with the digital camera;
   (c) creating with the authentication system within the digital camera first authentication data from said original image data, said first authentication data for the purpose of comparing with second authentication data created from second image data in order to determine if said second image data is identical to said original image data; and
   (d) encrypting with the authentication system within the digital camera said first authentication data to create encrypted first authentication data and associating the encrypted first authentication data with the original image data for output from the digital camera, whereby the first authentication data is inaccessible from the digital camera in unencrypted form and the original image data is inaccessible from the digital camera without its associated encrypted first authentication data.

2. A method as recited in claim 1 further comprising:
   (a) transferring said encrypted first authentication data to an external device;
   (b) decrypting said encrypted first authentication data in response to a user presentation of said password to form said first authentication data; and
   (c) comparing said first authentication data with said second authentication data to determine if said second image data is identical to said original image data.

3. A method as recited in claim 1 wherein said password is received from an external device.

4. A method as recited in claim 1 wherein said creating and said encrypting take place during said acquiring original image data, whereby there is no step allowing storage of unencrypted said first authentication data in a form from which an unauthorized person could obtain access to said first authentication data.

5. A method as recited in claim 2 wherein said creating said first authentication data includes
   a) performing a first row calculation according to a predetermined formula on groups of one or more rows of pixels to form a first set of row authentication data; and
   b) performing a first column calculation according to a predetermined formula on groups of one or more columns of pixels to form a first set of column authentication data,
   whereby said first set of row data can be compared with a second set of row data resulting from a row calculation performed on said second image data, and said first set of column data can be compared with a second set of column data resulting from a column calculation performed on said second image data, and the location of an alteration in said second image data is determined by the intersection of an altered group of rows of said second set of row data with an altered group of columns of said second set of column data.

6. A method as recited in claim 1 wherein said first authentication data is checksum data.

7. A method as recited in claim 6 wherein said checksum data is prepared by adding color numbers of selected groups of rows and columns of said original image data, and by storing values of said rows and columns of said original image data in a lookup table.

8. A method of marking an image in a digital camera comprising the steps of:
   (a) initializing a marking system in the digital camera with indicium data used in marking the image and a user programmable encryption password;
   (b) acquiring original image data with the digital camera;
   (c) converting with the marking system within the digital camera said original image data to marked image data, said converting taking place within said digital camera and including use of said indicium data and a conversion formula to convert said original image data to said marked image data; and
   (d) encrypting with the marking system within the digital camera said indicium data to create encrypted indicium data and associating the encrypted indicium data with the marked image data for output from the digital camera, whereby the original image data is inaccessible from the digital camera but may be recovered from the marked image data after decryption of the encrypted indicium data.

9. A method as recited in claim 8 further comprising:
   receiving said password by said digital camera from an external device.

10. A digital camera providing image authentication comprising:
    (a) an authentication system in the camera, the authentication system being user programmable with a user selected encryption password;
    (b) means for acquiring original image data;
    (c) means for creating with the authentication system within the camera first authentication data from original image data, said first authentication data for the purpose of comparing with second authentication data created from second image data in order to determine if said second image data is identical to said original image data; and
    (d) means for encrypting with the authentication system within the camera said first authentication data to create encrypted first authentication data and for associating the encrypted first authentication data with the original image data for output from the camera, whereby the first authentication data is inaccessible from the camera in unencrypted form and the original image data is inaccessible from the camera without its associated encrypted first authentication data.

11. A digital camera as recited in claim 10 further comprising:
    means for transferring said encrypted first authentication data to an external device.

12. A digital camera as recited in claim 10 further comprising:

means for receiving said password from an external device.

13. A digital camera as recited in claim 10 wherein said first authentication data is held temporarily in register means prior to said encrypting, whereby there is no first authentication step allowing storage of unencrypted data in a form from which an unauthorized person could obtain access to said first authentication data.

14. A digital camera as recited in claim 11 wherein said means for creating said first authentication data includes a) means for performing a first row calculation according to a predetermined formula on groups of one or more rows of pixels to form a first set of row authentication data; and b) means for performing a first column calculation according to a predetermined formula on groups of one or more columns of pixels to form a first set of column authentication data, whereby in said external device said first set of row data can be compared with a second set of row data resulting from a row calculation performed on said second image data, and said first set of column data can be compared with a second set of column data resulting from a column calculation performed on said second image data, and the location of an alteration in said second image data is determined by the intersection of an altered group of rows of said second set of row data with an altered group of columns of said second set of column data.

15. A digital camera as recited in claim 10 wherein said first authentication data is checksum data.

16. A digital camera as recited in claim 15 wherein said means for creating first authentication data includes means for preparing said checksum data by adding color numbers of selected groups of rows and columns of said original image data, and by storing values of said rows and columns of said original image data in a lookup table.

17. A digital camera for securely marking an image comprising:

(a) a marking system in the camera, the marking system providing indicium data used to mark the image and being user programmable with a user selected encryption password;

(b) means for acquiring original image data;

(c) means for converting with the marking system within the camera said original image data to marked image data, said means for converting including use of said indicium data and a conversion formula to convert said original image data to said marked image data; and (d) means for encrypting with the marking system within the camera said indicium data to create encrypted indicium data and for associating the encrypted indicium data with the marked image data for output from the camera, whereby the original image data is inaccessible from the camera but may be recovered from the marked image data after decryption of the encrypted indicium data.

18. A digital camera as recited in claim 17 further comprising:

means for receiving said password from an external device.

* * * * *